(12) United States Patent
Mann

(10) Patent No.: US 6,523,405 B1
(45) Date of Patent: Feb. 25, 2003

(54) PORTABLE BIN FULL INDICATOR

(76) Inventor: Ken Mann, Box 158, Dinsmore, Saskatchewan (CA), S0L 0T0

( * ) Notice: Subject to any disclaimer, the term of this patent is extended or adjusted under 35 U.S.C. 154(b) by 0 days.

(21) Appl. No.: 09/590,453

(22) Filed: Jun. 9, 2000

(30) Foreign Application Priority Data

Jun. 10, 1999 (CA) .............................................. 2274191

(51) Int. Cl.[7] .......................... G01F 23/30; G01F 23/36; G01F 23/32; G08B 21/00; F16K 31/18
(52) U.S. Cl. ........................... 73/308; 73/313; 340/623; 137/434; 116/229
(58) Field of Search .......................... 73/305, 307, 308, 73/318, 313, 290 R, 865.8; 137/409, 410, 434; 116/228, 229; 340/623

(56) References Cited

U.S. PATENT DOCUMENTS

| | | | | |
|---|---|---|---|---|
| 3,857,358 A | * | 12/1974 | Ward et al. ................. | 116/110 |
| 4,301,440 A | * | 11/1981 | Kubota et al. ................ | 340/59 |
| 4,312,225 A | * | 1/1982 | Williams .................... | 73/308 |
| 4,942,351 A | * | 7/1990 | Kronau ....................... | 318/642 |
| 5,006,834 A | * | 4/1991 | Fountain ..................... | 340/625 |
| 5,053,751 A | * | 10/1991 | Gould ........................ | 340/623 |
| 5,225,813 A | * | 7/1993 | Raub, Sr. .................... | 340/623 |
| 5,789,675 A | * | 8/1998 | Blaine et al. ............. | 73/290 R |
| 5,850,175 A | * | 12/1998 | Yeilding ..................... | 340/431 |
| 5,898,376 A | * | 4/1999 | Webb ......................... | 340/623 |

FOREIGN PATENT DOCUMENTS

| | | | | |
|---|---|---|---|---|
| GB | 1590751 | * | 6/1981 | ................. 73/308 |
| JP | 404166724 | * | 6/1992 | ................. 73/313 |

* cited by examiner

Primary Examiner—Hezron Williams
Assistant Examiner—Katina Wilson
(74) Attorney, Agent, or Firm—Frost Brown Todd LLC

(57) ABSTRACT

A portable bin full indicator is disclosed comprising a sensor operable to send a signal when the level of particulate material in a bin reaches the level of the sensor; means to temporarily secure the sensor in a top portion of the bin; an alarm operatively connected to the sensor such that it is activated by the signal; and a battery to supply electrical power to the sensor and alarm. An extensible handle is provided to allow insertion into a bin by an operator standing on the ground, and also an adjustable hook is provided that may be configured for various bins.

16 Claims, 3 Drawing Sheets

PORTABLE BIN FULL INDICATOR

This invention is in the field of indicators for determining when a bin is full and in particular a such an indicator that may be moved from one bin to another.

BACKGROUND

There are presently numerous bin full indicators for indicating when the level of particulate material such as grain is reaching the top of a bin or other bulk container. There are pop-up devices wherein an indicator rises above the bin roof in response to the pressure of the particulate material on an arm located near the roof on the inside of the bin. Some bins have windows near the top so a visual check will show that the bin is full. Various electronic means are also used wherein a change in the resistance, capacitance or other electrical property of a sensor indicates, through a monitor and alarm operatively connected thereto, that the material in the bin has reached the level of the sensor. Alternatively a switch, such as a mercury switch, may be activated by the pressure of grain against the switch, or the material may interrupt the light beam in a photo-electric cell thereby triggering an alarm.

The problem with these prior art bin full indicators is that there must be a sensor mounted in each bin, which is costly. The monitor unit may be moved from bin to bin and connected to the sensor at each bin, but there is a sensor permanently installed in each bin. These systems are not only costly, but the numerous sensors and there assorted hardware or wiring must be maintained, thus increasing the time and cost involved in using such indicators.

In applications such as agricultural grain bins, each bin is usually filled only once a year, and a single farm often has 20–30 bins and often many more than that. Farmers are reluctant to spend the considerable funds required to install a sensor of the prior art indicators in each of these bins, some of which could be quite small. As a result the general practice in spite of the available technology is to repeatedly climb to the top of the bin and look in to monitor when the bin is full. Especially in the dark, when considerable harvesting is done, this can be dangerous, especially when the bin becomes full before the operator thinks it should be, causing him to rush down the ladder to turn off the auger filling the bin before grain is spilled.

Many farmers like to fill each bin to its maximum, as they often are short of storage space and every bushel in a bin is one that doesn't have to be stored on the ground in the open. As a result, it is often the case that the descent from the bin roof is hurried, and it is not rare for accidents to occur.

A bin full indicator that was portable would be advantageous, drastically reducing costs and maintenance. The same equipment would be used in each bin, thus reducing the number of sensors to one. Such an indicator that allowed for temporary installation of the sensor in the bin from the ground would be further advantageous, removing the need to climb to the bin roof to insert the sensor through the bin roof access door.

SUMMARY OF THE INVENTION

It is the object of the present invention to provide a portable bin full indicator with the sensor and monitor thereof transportable from bin to bin wherein installation is accomplished by inserting the sensor thereof into an upper portion of the bin, such as through a roof access door.

It is a further object of the present invention to provide such an indicator wherein the sensor can be installed while the operator is standing on the ground.

The invention accomplishes its objects providing in one aspect a portable bin full indicator comprising a sensor operable to send a signal when the level of particulate material in a bin reaches substantially the level of the sensor; means to temporarily secure said sensor in a top portion of said bin, an alarm operatively connected to said sensor such that said alarm is activated by said signal; and a battery to supply electrical power to said sensor and alarm.

The sensor may be a switch, such as a mercury switch or photo-electric switch, or a sensor wherein a change in electrical properties such as capacitance or resistance is caused by the material contacting the sensor. All that is required is a sensor that will send a signal to activate the alarm when the material in the bin reaches the level of the sensor. Depending on the sensor used, the material level relative to the sensor position required to send the signal may be higher or lower, but can be readily determined.

The alarm may be a visual alarm such as light, or an audible alarm, such as a siren, or any alarm or combination of alarms that will be noticeable to the operator to indicate that the bin is full.

The means to secure the sensor in a top portion of the bin can be any means by which the sensor be located near the desired full bin level such that it will be activated when the level of material in the bin reaches the level of the sensor.

The sensor, means to secure the sensor, alarm and battery are preferably mounted on an indicator assembly so as to be easily portable as a unit.

The means to temporarily secure the sensor could comprise a hanger attached to the sensor and adapted to hang from a portion of the bin. The hanger could conveniently comprise a handle having a top end and a bottom end and further comprise a lateral member having an inside end attached to the sensor and an outside end attached to the top end of the handle wherein the handle and the lateral member are oriented relative to each other such that the inside end of the lateral member can extend into the top portion of the bin through a roof access door or the like, when the handle is on the outside of the bin. The hanger could further comprise a sensor member having an upper end attached to the inside end of the lateral member and a lower end attached to the sensor, the sensor member, lateral member and handle oriented relative to each other such that when the handle is substantially vertical the lateral member extends away from the handle and the sensor member extends downwards from the inside end of the lateral member.

The orientation of the sensor member, lateral member and handle could be adjustable and at least one of the sensor member, lateral member and handle could have a length that may be adjusted so as to allow proper orientation for different bins and the location of bin roof access doors relative to the bin roof eaves.

The hanger could basically comprise a hook and a handle wherein the sensor is attached at an inside end of the hook and wherein a top end of the handle is attached to an outside end of the hook. The alarm and battery could be conveniently mounted on the hook or the handle thereby making up an indicator assembly that could be easily carried from place to place.

The handle could have a length that is adjustable such that an operator standing beside a bin may extend the handle to a length sufficient to insert the inside end of the hook into a roof access door of the bin. The assembly would then simply hang on the bin. The alarm and battery could be mounted in proximity to a bottom end of the handle thereby keeping the upper part of the assembly as light as possible and easier to control.

In a second aspect the invention provides a portable bin full indicator comprising a hook, having an inside end and an outside end; a sensor attached to the inside end of the hook and operable to send a signal when the level of particulate material in a bin reaches substantially the level of the sensor; an alarm mounted on the hook and operatively connected to the sensor such that the alarm is activated by the signal; and a battery mounted on the hook to supply electrical power to the sensor and alarm.

Conveniently the hook has a length sufficient so that an operator standing beside a bin holding the outside end of the hook can insert the inside end of the hook into a roof access door of the bin. The hook remains in place hanging on the bin when the operator releases the outside end thereof.

may be adjusted such that an operator standing beside a bin holding the outside end of the hook can extend the hook to a length sufficient to insert the inside end of the hook into a roof access door of the bin, the hook remaining in place hanging on the bin when the operator releases the outside end thereof. The hook could be an arched hook sized to allow for proper orientation in the bin.

The hook could also comprise a handle, a lateral member, and a sensor member wherein the sensor member is attached at a lower end thereof to the sensor and at an upper end thereof to an inside end of the lateral member, and wherein the lateral member is attached at an outside end thereof to a top end of the handle. The lengths of the handle, lateral member, and sensor member could be adjustable, as could the angle between the members, thereby allowing considerable adjustment for various bin configurations.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
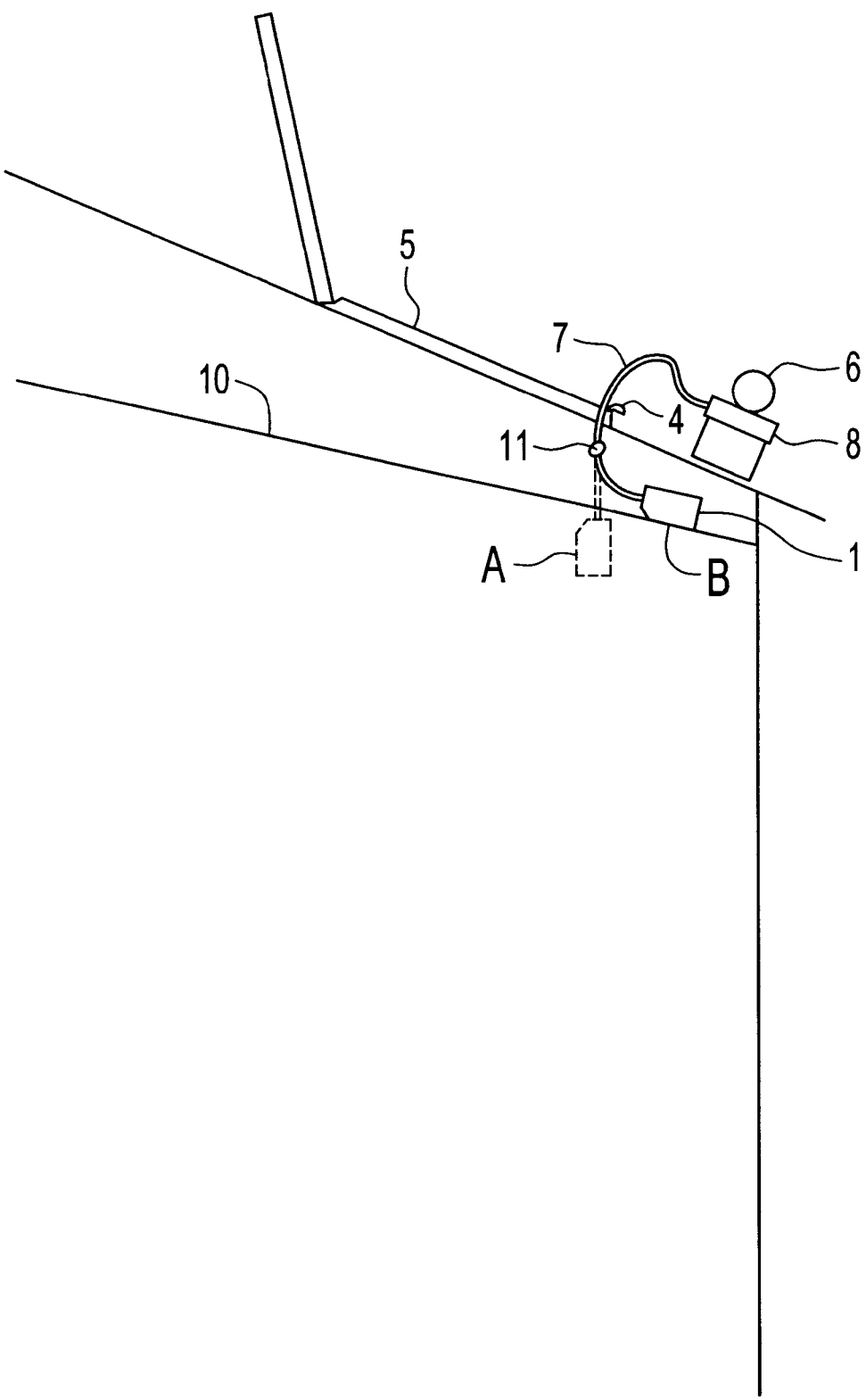
FIG. 1 is an expanded side view of an embodiment mounted in a bin, the bin being only schematically illustrated for clarity.

FIG. 1 illustrates a simple embodiment of the invention providing a portable bin full indicator comprising a sensor 1 operable to send a signal when the level of grain 9, or other particulate material, in a bin 3 reaches the level of the sensor 1. Means are provided in the form of a hook 4 to temporarily secure the sensor 1 in a top portion of the bin 3. The hook 4 is simply hooked on the edge of the roof access door 5 and is attached by a clamp 11 to a midpoint of cable 7 which operatively connects an alarm 6 to the sensor 1 such that the alarm 6 is activated by the signal. A battery 8 supplies electrical power to the alarm 6 which is attached thereto and also to the sensor 1 via the cable 7.

In the embodiment illustrated in FIG. 1, the sensor 1 is a mercury switch which sends a signal by closing the switch when the pressure of the rising grain 9, or any other particulate material, pushes it from the vertical position A to the tilted position B. The sensor could be any other conventional sensor that will send a signal when the grain reaches it, but will preferably be a sensor that does not require a constant current to monitor the sensor. Such a constant current draw would greatly reduce the life of the battery, and therefore a switch sensor or the like is preferred. The relative positions of the hook 4 and sensor 1 can be adjusted on the cable 7 so that the alarm signal is sent when the grain level 10 reaches the desired level.

The alarm 6 can be visual such as the light illustrated, audible or any other means that is noticeable and that will indicate to the operator that the bin is full. The sensor 1, hook 4, alarm 6 and battery 8 are connected together by the cable 7 to form an indicator assembly which can easily be transported from bin to bin.

Figure 2:
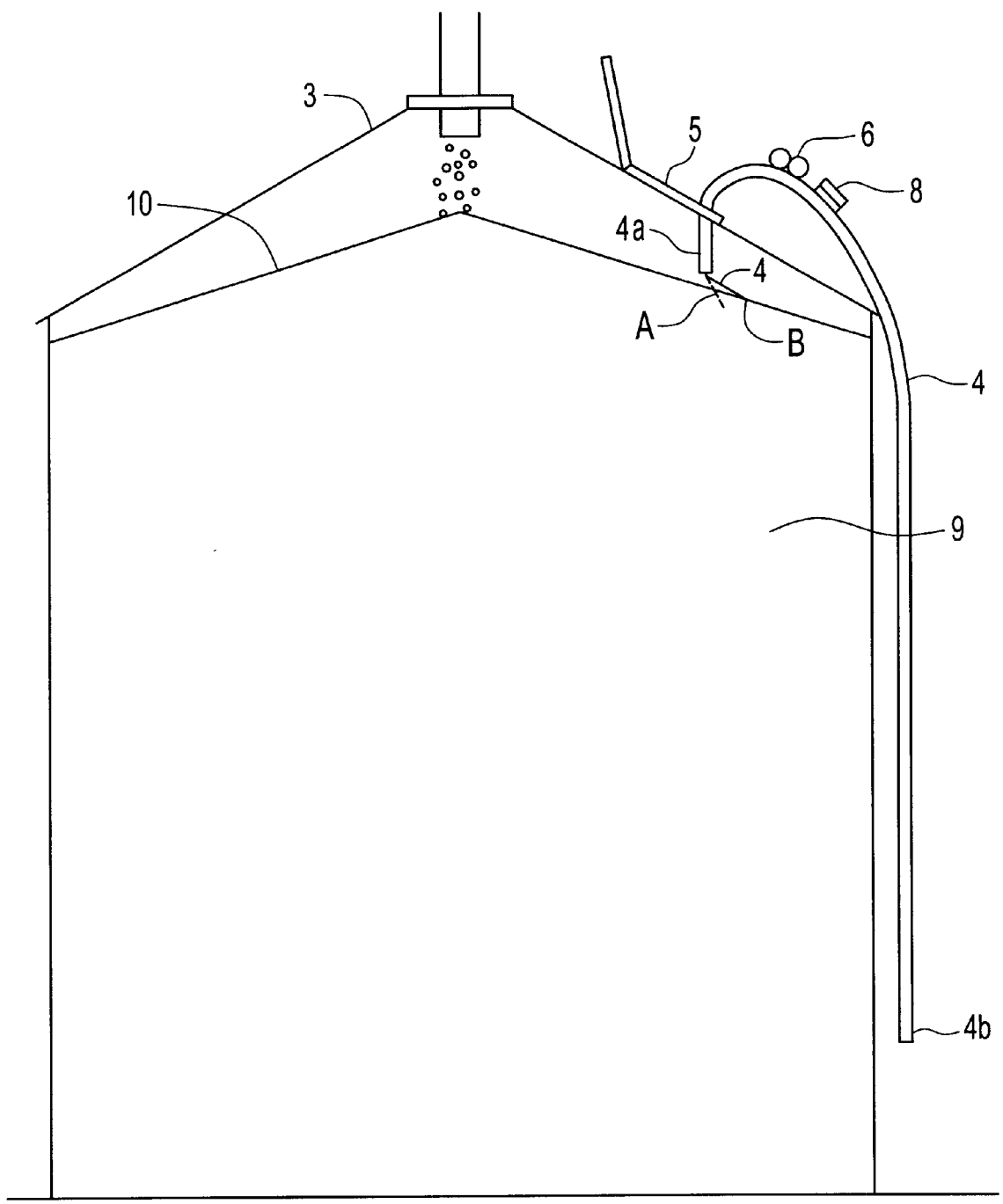
FIG. 2 is a side view of an alternate embodiment mounted in a bin, the bin being only schematically illustrated for clarity.

The embodiment of FIG. 1 requires that the operator climb to the top of the bin to temporarily install the indicator. When the bin is full, the operator must climb up again to retrieve the indicator. FIG. 2 illustrates an alternate embodiment comprising a hook 4, having an inside end 4a and an outside end 4b. A sensor 1 is attached to the inside end 4a of the hook 4 which operates so as to send a signal when the level 10 of grain 9 in a bin 3 reaches the level of the sensor 1. The illustrated sensor 1 is a simple toggle switch which moves from the off position A to the on position B when the grain level reaches it, thereby sending current to the alarm 6, mounted as shown on the hook 4, through conductors (not shown) inside the hook 4. A battery 8 is also mounted on the hook 4 to supply electrical power to the sensor 1 and alarm 2. The alarm 6 illustrated is a combination siren and light.

The hook 4 of FIG. 2 has a length sufficient so that an operator standing beside the bin 3 holding the outside end 4b of the hook 4 can insert the inside end 4a thereof into a roof access door 5 of the bin 3. The hook 4 remains in place hanging on the bin 4 when the operator releases the outside end 4b thereof.

Figure 3:
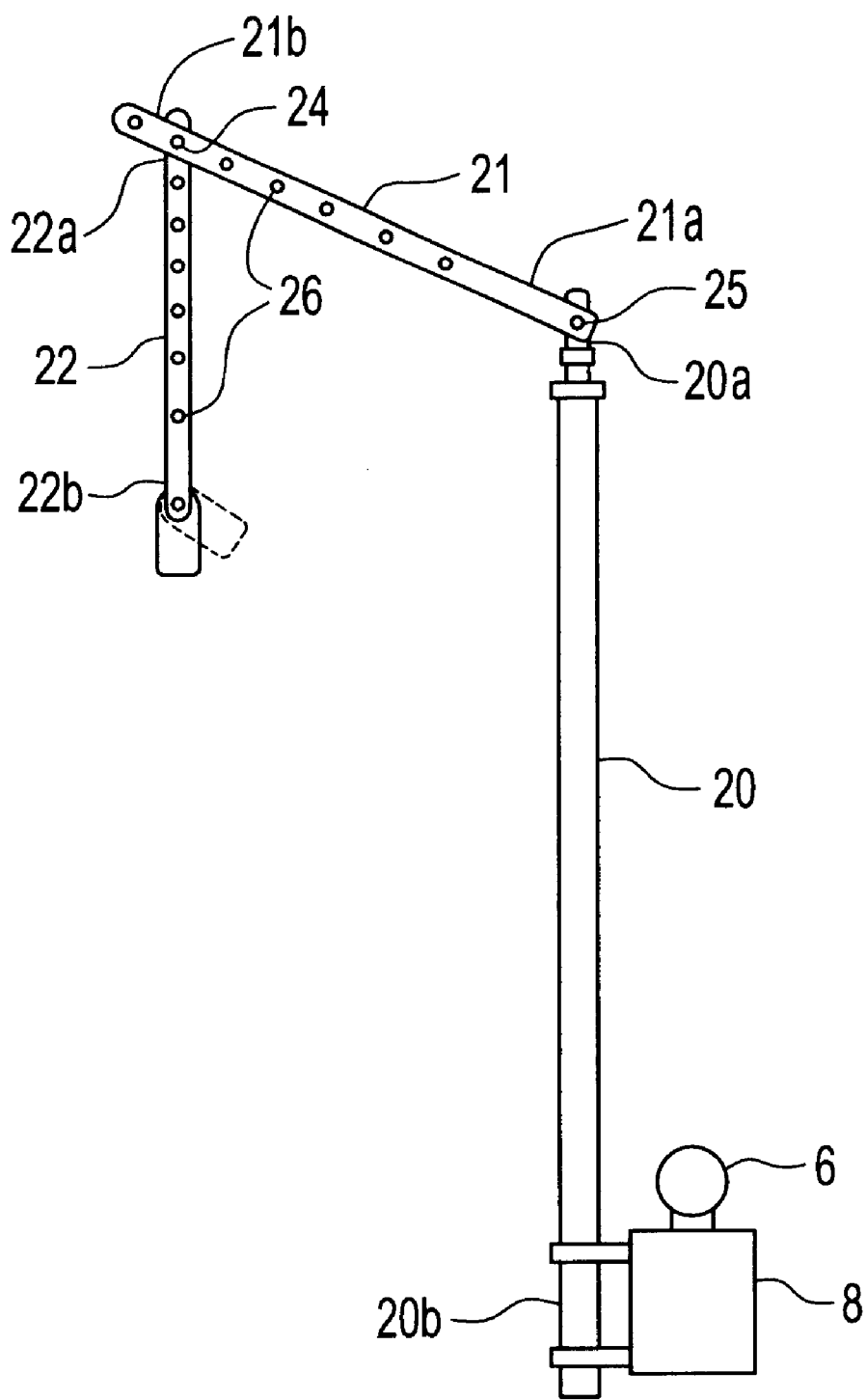
FIG. 3 is a side view of a further alternate embodiment.

FIG. 3 illustrates an embodiment where the hook 4 comprises a handle 20, a lateral member 21, and a sensor member 22. The sensor 1, again a mercury switch, is pivotally attached to the lower end 22b of the sensor member 22 so that it may swing from the open position A to the closed position B so as to send current from the battery 8 to activate the alarm 6.

The sensor member 22 is pivotally attached at the upper end 22a thereof to the inside end 21b of the lateral member 21. The lateral member 21 is pivotally attached at the outside end 21a thereof to the top end 20a of the handle 20. These pivotal attachments allow adjustment of the orientation between the elements to allow for various configurations of bin roof access doors 5, roof slopes and roof eaves 23. Once the desired orientation is achieved, the pivot bolts 24, 25 connecting the members are tightened so that the connection becomes rigid. The effective length of the lateral member 21 and sensor member 22 may be changed by moving the pivot bolt 24 to any one of the adjustment holes 26 in the lateral member 21 and sensor member 22.

The handle 20 is a telescoping handle allowing an operator standing beside the bin 3 holding the bottom end 20b of the handle 20 can extend the hook 4 to a length sufficient to insert the lower end 22b of the sensor member 22, and thus the sensor 1 into the roof access door 5 in substantially the same fashion as that illustrated with the fixed length hook 4 of FIG. 2.

The alarm 6 and battery 8 are mounted in proximity to the bottom end 20b of the handle 20, thereby reducing the weight of that portion of the hook 4 that must be raised to the roof access door 5, and improving the operator's control of the assembly.

All the illustrated embodiments have the elements of the bin full indicator connected together in an indicator assembly which may be conveniently transported from bin to bin. The indicator may be inserted in a bin 3 at any convenient time, such as after the operator has started filling the bin 3 with grain 9 or other particulate material and before their is any possibility that the bin 3 is full.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A portable bin fill indicator comprising:
   a sensor operable to send a signal when a level of particulate material in a bin reaches substantially the level of the sensor;
   a handle having a top end and a bottom end and further comprising a lateral member having an inside end attached to said sensor and an outside end attached to said top end of the handle wherein said handle and said lateral member are oriented relative to each other such that said inside end of the lateral member can extend into said top portion of the bin through a roof access door when said handle is on the outside of said bin;
   an alarm operatively connected to said sensor such that said alarm is activated by said signal; and
   a battery to supply electrical power to said sensor and alarm.

2. The invention of claim 1 further comprising a sensor member having an upper end attached to said inside end of the lateral member and a lower end attached to said sensor, said sensor member, lateral member and handle oriented relative to each other such that when said handle is substantially vertical said lateral member extends away from said handle and said sensor member extends downwards from said inside end of the lateral member.

3. The invention of claim 2 wherein the orientation of said sensor member, lateral member and handle may be adjusted.

4. The invention of claim 3 wherein at least one of said sensor member, lateral member and handle has a length that may be adjusted.

5. A portable bin full indicator comprising:
   a sensor operable to send a signal when the level of particulate material in a bin reaches substantially the level of the sensor;
   a hook and a handle, and wherein said sensor is attached at an inside end of said hook and wherein a top end of said handle is attached to an outside end of said hook;
   an alarm operatively connected to said sensor such that said alarm is activated by said signal; and
   a battery to supply electrical power to said sensor and alarm.

6. The invention of claim 5 wherein said alarm and battery are mounted on said hook or said handle.

7. The invention of claim 5 wherein said handle has a length that is adjustable such that an operator standing beside a bin may extend said handle to a length sufficient to insert said inside end of said hook into a roof access door of the bin.

8. The invention of claim 7 wherein said alarm and battery are mounted in proximity to a bottom end of said handle.

9. A portable bin full indicator comprising:
   a hook, having an inside end and an outside end;
   wherein said hook has a length sufficient so that an operator standing beside a bin holding said outside end of the hook can insert said inside end of the hook into a roof access door of the bin, said hook remaining in place hanging on said bin when said operator releases said outside end thereof;
   a sensor attached to said inside end of the hook and operable to send a signal when the level of particulate material in a bin reaches substantially the level of the sensor;
   an alarm mounted on said hook and operatively connected to said sensor such that said alarm is activated by said signal;
   a battery mounted on said hook to supply electrical power to said sensor and alarm.

10. The invention of claim 9 wherein said alarm and battery are mounted in proximity to said outside end of the hook.

11. The invention of claim 9 wherein said hook comprises a handle, a lateral member, and a sensor member, and wherein said sensor member is attached at a lower end thereof to said sensor and at an upper end thereof to an inside end of said lateral member, and wherein said lateral member is attached at an outside end thereof to a top end of said handle.

12. The invention of claim 11 wherein said handle has a length that is adjustable.

13. The invention of claim 12 wherein said alarm and battery are mounted in proximity to a bottom end of the handle.

14. The invention of claim 12 wherein at least one of said lateral member and said sensor member has a length that may be adjusted.

15. The invention of claim 14 wherein the angle between said handle and lateral member may be adjusted.

16. The invention of claim 15 wherein the angle between said lateral member and said sensor member may be adjusted.

* * * * *